(12) United States Patent
Gibeau et al.

(10) Patent No.: US 6,443,510 B2
(45) Date of Patent: Sep. 3, 2002

(54) DEVICE FOR PROTECTING A VEHICLE AGAINST IMPACT

(75) Inventors: Michel Gibeau, La Jarne; Jean-Jacques Laporte, La Rochelle, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/821,157

(22) Filed: Mar. 30, 2001

(30) Foreign Application Priority Data

Apr. 4, 2000 (FR) .............................................. 00 04254

(51) Int. Cl.$^7$ .............................................. B60R 19/40
(52) U.S. Cl. ........................................ 293/107; 293/110
(58) Field of Search ................................ 293/107, 108, 293/110, 118; 280/770; 105/392.5

(56) References Cited

U.S. PATENT DOCUMENTS 3,938,840 A   2/1976   Haase
4,061,385 A   12/1977  Schwartzberg
4,815,777 A   3/1989   Campbell

FOREIGN PATENT DOCUMENTS

FR   2 224 325   10/1974

*Primary Examiner*—Joseph D. Pape
(74) *Attorney, Agent, or Firm*—Sughrue Mion, PLLC

(57) ABSTRACT

A device for protecting a vehicle against impact, the device comprising an inflatable element which, once inflated, presents a general shape that fits closely over the region of the vehicle to be protected, wherein said inflatable element includes a skin which is deployed by an inflatable reinforcement having a volume that is much smaller than the volume of the skin, pressurizing and deploying said inflatable reinforcement ensuring rapid deployment of said skin and simultaneously causing the internal volume of the inflatable element to be filled with air, by suction, via an air inlet device carried by said skin.

7 Claims, 3 Drawing Sheets

DEVICE FOR PROTECTING A VEHICLE AGAINST IMPACT

The invention relates to a device for protecting a vehicle against impact, and more particularly to a device comprising an inflatable element which, once inflated, presents a general shape that fits closely over the region of the vehicle to be protected.

The protection device of the invention preferably applies to the rail industry, in particular to trams or the like, for which the inflatable protective element is particularly bulky.

BACKGROUND OF THE INVENTION

It is known from document GB 2 020 234 to use an inflatable protective cushion at the front of a rail vehicle to cushion shock during impact with a human being or any other obstacle. It is also known from that document to inflate the cushion prior to impact by injecting gas under high pressure into the inflatable cushion, the gas being stored, under normal conditions, in tanks carried by the vehicle.

However, when the inflatable cushion is large in volume, such a device has the drawback of requiring a long period of time to inflate the protective cushion. Unfortunately, the inflatable cushion must be deployed very rapidly for the protective device to be effective even when the cushion is triggered to open shortly before impact.

Another drawback of that device is the need to have large-capacity gas cylinders to enable the protective element to be inflated under pressure, which cylinders are costly and make the rail vehicle heavy and bulky. In addition, it is difficult to envisage the use of a pyrotechnic gas generator for such a device, by analogy with devices used for motor vehicles, since said generator would then present a significant potential danger as a result of the power required to inflate a large-volume inflatable cushion and of the toxicity of the gas.

OBJECTS AND SUMMARY OF THE INVENTION

The invention seeks to remedy those drawbacks.

The object of the present invention is thus to propose a device for protecting a vehicle against impact, which device ensures rapid deployment of the inflatable element and is simple to make and of low cost.

The invention provides a device for protecting against impact, the device comprising an inflatable element which, once inflated, presents a general shape that fits closely over the region of the vehicle to be protected.

In the invention, the inflatable element includes a skin which is deployed by means of inflatable reinforcement having a volume that is much smaller than the volume of the skin, pressurizing and deploying the inflatable reinforcement ensuring rapid deployment of the skin and simultaneously causing the internal volume of the inflatable element to be filled with air, by suction, via inlet means carried by the skin.

BRIEF DESCRIPTION OF THE DRAWINGS

The objects, characteristics, and advantages of the present invention will be better understood on reading the following description of a preferred embodiment of the invention and of a variant embodiment, given as nonlimiting examples, and with reference to the accompanying drawings, in which.

MORE DETAILED DESCRIPTION

To make the drawings easier to understand, only the elements necessary for understanding the invention are shown.

Figure 1:
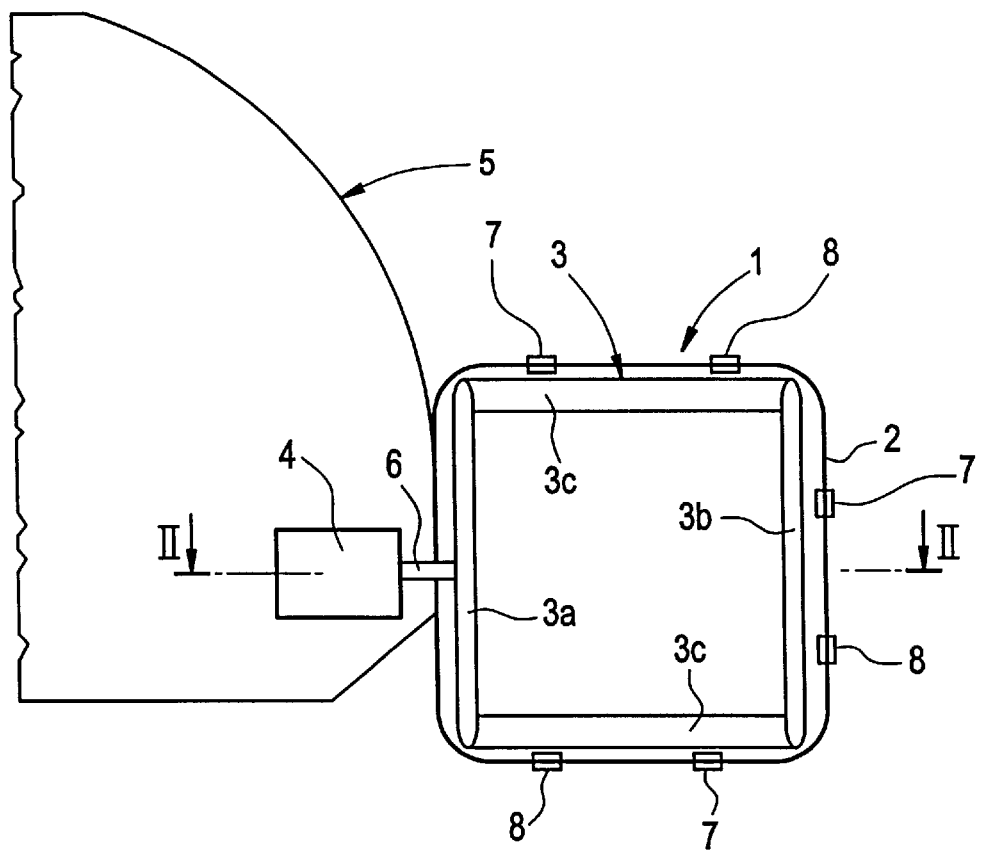
FIG. 1 is a diagrammatic, lateral section-view of a rail vehicle equipped with a protection device of the invention in the deployed position.

FIG. 1 shows a rail vehicle 5 of the tram type equipped with a device for providing protection against impact, the device being constituted by an inflatable element 1.

The inflatable element 1 includes a large-volume skin 2 that is made of fabric and that is substantially in the shape of a rectangular parallelepiped, and which, once deployed, fits closely over the front face of the vehicle to be protected. The skin 2 surrounds inflatable reinforcement 3 which is of a volume that is much smaller than the volume of the skin 2. The inflatable reinforcement 3 is connected via a duct 6 to a supply 4 of compressed gas carried by the tram 5. The duct 6 includes a controlled valve (not shown in the figures) that is closed under normal conditions, and that enables the reinforcement 3 to be pressurized in order to inflate it rapidly.

Figure 2:
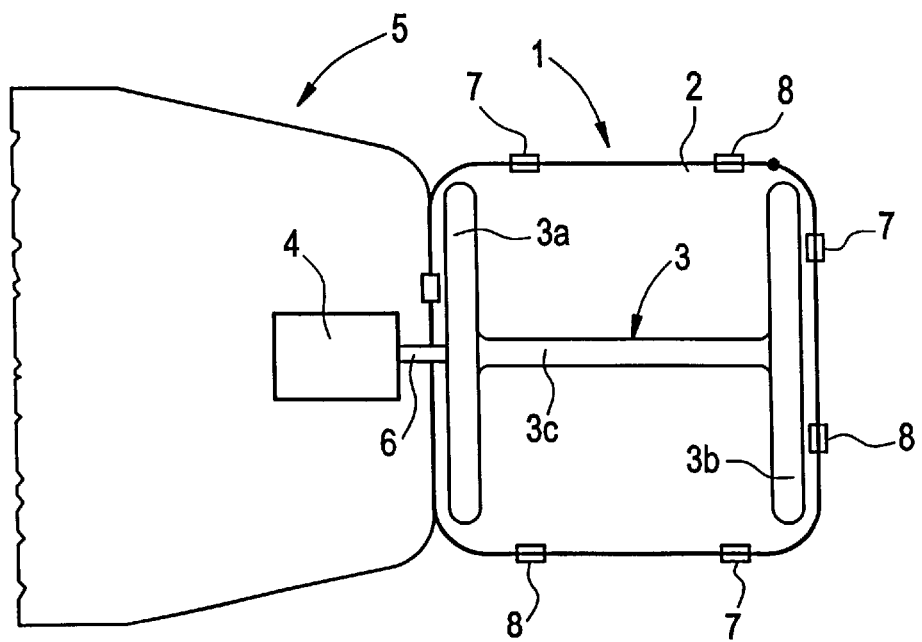
FIG. 2 is a section view on line II—II of FIG. 1 of the vehicle equipped with the device of the invention.
Figure 3:
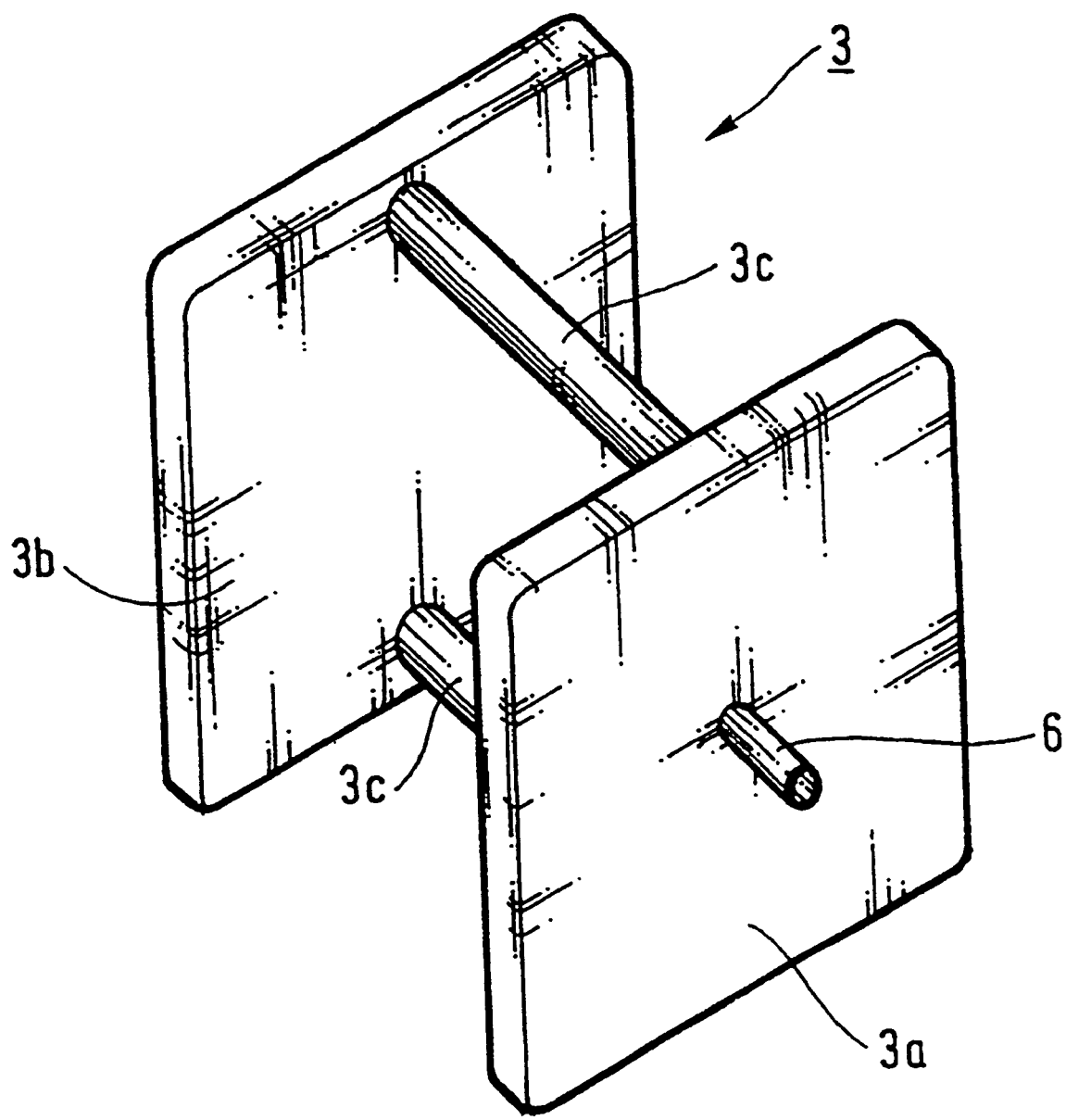
FIG. 3 is a perspective view of the inflatable reinforcement of FIG. 2 shown on its own.

In the embodiment shown in FIGS. 1 to 3, the inflatable reinforcement 3 is constituted by two flat, vertical cushions 3a and 3b that are parallel to the front face of the tram 5, and by two flexible tubes 3c providing communication between the flat cushions 3a, 3b. The two tubes 3c are disposed perpendicularly to the two flat cushions 3a and 3b and hold the two flat cushions 3a and 3b parallel to each other and at a distance from each other once the reinforcement 3 is inflated. The flat cushions 3a and 3b and the tubes 3c are dimensioned in such a manner that, once inflated, the size of the inflatable reinforcement 3 substantially corresponds to the size of the deployed skin 2.

To ensure that the skin 2 is filled with air when it is deployed under the action of the reinforcement 3 inflating, the walls of the skin 2 include air inlet means 7, for example, check valves, enabling air to pass therethrough under the effect of the suction created inside the skin 2.

In the embodiment shown, the flat cushions 3a and 3b and the tubes 3c are not connected to the skin 2 so that the inflatable reinforcement 3 can be deployed freely inside the skin 2.

The operation of the protection device is described below:

Under normal working conditions, the inflatable element 1, constituted by its skin 2 and by its inflatable reinforcement 3, is in a folded state at the front of the tram, inside a compartment provided for this purpose.

When the risk of a collision is detected, either automatically, or following the intervention of a driver, compressed gas from the supply 4 is injected into the inflatable reinforcement 3, which, under the pressure, deploys instantly inside the skin 2. The flat cushions 3a and 3b and the tubes 3c thus bear against the walls of the skin 2 and force the inflatable element 1 to deploy, simultaneously causing air to pass through the inlet valves 7 of the skin 2. The protection device is thus ready to cushion impact against any object.

To favor cushioning the impact, the skin 2 is porous, or includes calibrated openings 8 disposed on the surface of the skin 2, enabling air to be expelled progressively from inside the skin 2 under the effect of excess pressure created by an impact. Naturally, the inflatable reinforcement 3 also helps to cushion the shock by deforming progressively under impact and provides some control over the deformation of the inflatable element 1 under impact.

Figure 4:
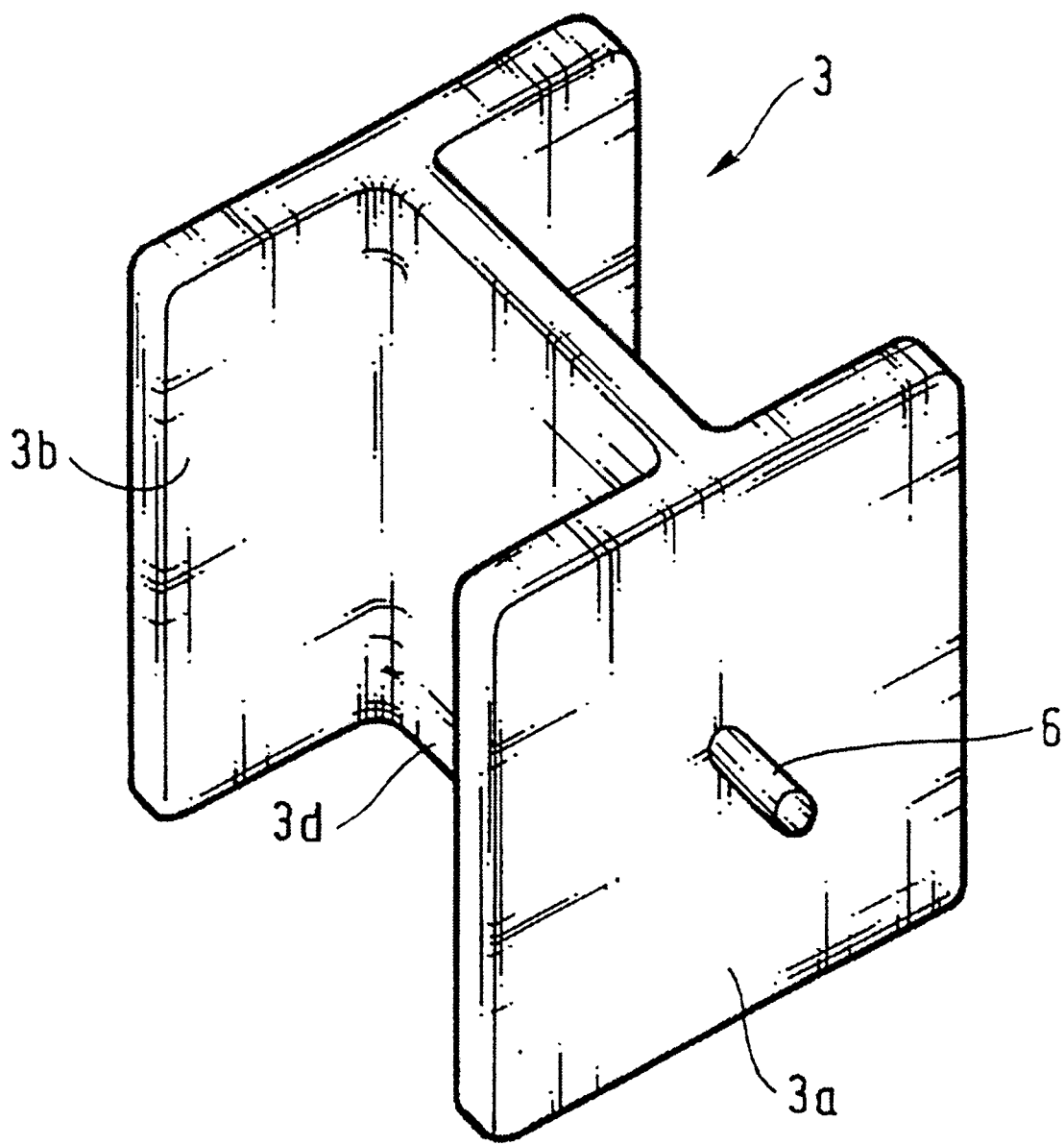
FIG. 4 is a perspective view of a variant embodiment of the inflatable reinforcement of the device of the invention.

FIG. 4 shows a variant embodiment of the invention in which the flexible tubes 3c of the inflatable reinforcement 3 are replaced by a third flat cushion 3d disposed perpendicularly to the two flat cushions 3a, 3b and providing communication between said two flat cushions 3a and 3b. This variant embodiment enables the reinforcement 3 to be more rigid.

Such a device, enabling a large-volume inflatable element to be deployed by means of inflatable reinforcement having a volume that is much smaller than that of the inflatable element, has the advantage of making it possible, as a result of the small volume of the inflatable reinforcement, for said inflatable reinforcement to be pressurized very rapidly, thereby enabling the inflatable element to be deployed rapidly. In addition, the small volume of the inflatable reinforcement enables a low-capacity gas supply to be used, thereby enabling the weight and bulkiness of the supply to be reduced. Finally, in a variant embodiment, it is possible, given the small quantity of gas required for deploying the reinforcement, to inflate the reinforcement by means of a pyrotechnic gas generator of the type normally used for inflating air bags in motor vehicles.

Naturally, the invention is not limited to the embodiment described and shown which has been given only by way of example.

The inflatable reinforcement could thus have a shape different from that described above in order to deploy the skin, e.g. it could be constituted by a network of flexible tubes having the shape of a rectangular parallelepiped that fits closely to the edges of the skin of the inflatable element.

Thus, in a variant embodiment not shown, the inflatable reinforcement could be connected to the inside or the outside surface of the skin, e.g. by adhesive or by passing tubes belonging to the reinforcement through specific sheaths carried by the skin. Such a variant embodiment has the advantage of ensuring excellent geometrical positioning of the elements of the inflatable reinforcement when it is deployed, thereby enabling an inflatable element to be designed that is of complex shape that fits perfectly over the surface to be protected.

What is claimed is:

1. A device for protecting a vehicle against impact, the device comprising:

an inflatable element which, once inflated, presents a general shape that fits closely over a region of the vehicle to be protected, wherein said inflatable element includes a skin which is deployed by an inflatable reinforcement having a volume that is much smaller than the volume of the skin, and wherein pressurizing and deploying said inflatable reinforcement ensures rapid deployment of said skin and simultaneously causes the internal volume of the inflatable element to be filled with air, by suction, via inlet means carried by said skin.

2. The device according to claim 1, wherein said reinforcement is deployed freely inside the skin.

3. The device according to claim 1, wherein said reinforcement comprises two flat, parallel cushions, and flexible tubes providing communication between the flat cushions and ensuring that said flat cushions are spaced apart when said inflatable reinforcement is inflated.

4. The device according to claim 1, wherein said reinforcement comprises:

two flat, parallel cushions, and a third flat cushion disposed perpendicularly to the two flat cushions and providing communication between the two flat cushions.

5. The device according to claim 1, wherein said reinforcement is connected to the surface of the skin.

6. The device according to claim 1, wherein said air inlet means comprises an inlet check valve.

7. The device according to claim 1, wherein said skin is porous, or includes calibrated openings, so as to enable the air to be expelled progressively during impact.

* * * * *